United States Patent
Hoehner et al.

(10) Patent No.: US 7,613,584 B2
(45) Date of Patent: Nov. 3, 2009

(54) METHODS, SYSTEMS AND COMPUTER PROGRAM PRODUCTS FOR AUTOMATICALLY DETECTING LEAKS IN A HYDRANT FUEL PIPING SYSTEM

(75) Inventors: Joerg Hoehner, Newmarket, NH (US);
Karl M. Overman, Tucson, AZ (US);
Ola M. Nordell, Simsbury, CT (US);
Walter O. Phelps, Stratham, NH (US)

(73) Assignee: Hansa Consult of North America, LLC, Portsmouth, NH (US)

( * ) Notice: Subject to any disclaimer, the term of this patent is extended or adjusted under 35 U.S.C. 154(b) by 29 days.

(21) Appl. No.: 11/799,325

(22) Filed: May 1, 2007

(65) Prior Publication Data

US 2007/0255515 A1    Nov. 1, 2007

Related U.S. Application Data

(60) Provisional application No. 60/796,448, filed on May 1, 2006.

(51) Int. Cl.
*G06F 19/00* (2006.01)
(52) U.S. Cl. .............................. 702/114; 702/1; 702/41; 702/138; 702/51; 73/40; 73/40.5 R; 73/49.2; 73/49.1; 73/49.5

(58) Field of Classification Search .............. 702/1, 702/45, 138, 114, 51; 73/40, 40.5 R, 49.2, 73/49.1, 49.5
See application file for complete search history.

(56) References Cited

U.S. PATENT DOCUMENTS

| 4,608,857 | A |   | 9/1986 | Mertens et al. |
| 4,862,734 | A | * | 9/1989 | Elderton ...................... 73/49.2 |
| 6,082,182 | A | * | 7/2000 | Fierro et al. ............. 73/40.5 R |
| 6,549,857 | B2 | * | 4/2003 | Fierro et al. .................. 702/51 |

OTHER PUBLICATIONS

Notification of Transmittal of the International Search Report and the Written Opinion of the International Searching Authority, or the Declaration for International Application No. PCT/US20/07010528 (Aug. 12, 2008).

* cited by examiner

*Primary Examiner*—Carol S Tsai
(74) *Attorney, Agent, or Firm*—Jenkins, Wilson, Taylor & Hunt, P.A.

(57) ABSTRACT

Methods, systems, and computer program products for automatically detecting leaks in a type III hydrant fuel piping system is described. In one embodiment, the method includes automatically actuating one or more valves to isolate a hydrant loop of a type III hydrant fuel piping system from the remainder of the system. The pressure in the hydrant loop is varied. The pressure in the hydrant loop is measured over time in response to the varying of the pressure.

22 Claims, 8 Drawing Sheets

METHODS, SYSTEMS AND COMPUTER PROGRAM PRODUCTS FOR AUTOMATICALLY DETECTING LEAKS IN A HYDRANT FUEL PIPING SYSTEM

RELATED APPLICATIONS

The present application claims the benefit of U.S. Provisional Patent Application Ser. No. 60/796,448, filed May 1, 2006; the disclosure of which is incorporated herein by reference in its entirety.

TECHNICAL FIELD

The subject matter described herein relates to pressurized fuel piping systems that include hardware peripherals and computer software for automated measurements and recordings. More particularly, the subject matter described herein relates to methods, systems, and computer program products for automatically detecting leaks in a type III hydrant fuel piping system.

BACKGROUND

A type III hydrant fuel system is a pressurized fuel distribution system that delivers fuel directly to an aircraft via underground piping. A typical type III hydrant fuel system may include several thousand linear feet of fuel distribution piping, a pumphouse with a control room, control panels, control valves, and several fueling pumps for providing the requisite pressure for the distribution of fuel. Although the type III hydrant fuel system may be used by any entity, it is most commonly utilized by military installations, such as U.S. Air Force airbases.

Although the use of a type III hydrant fuel system provides an efficient and effective way to fuel a fleet of aircraft, concerns pertaining to its proper operation exist. Namely, there is the concern that the underground pipelines associated with a hydrant fueling system, or any underground fuel system of this type, is susceptible to leaking. Consequently, the U.S. Environmental Protection Agency (EPA) has set forth regulations requiring owners and operators of underground fuel systems to utilize a system capable of detecting deficiencies or compromises in the fuel system that may permit the possibility of product release. More specifically, any facility that transports and provides storage of "water-polluting" products, such as fuel, must be able to detect a release from any portion of a tank and the connected underground fuel piping of these fuel systems. Environmental compliance for these systems is mandated by various state and local authorities.

In addition to merely abiding to these regulations from a legal perspective, entities utilizing underground fuel piping systems also employ a leak detection means for other reasons. For instance, a military air base may simply wish to operate in accordance to an "environmentally friendly" standard since harmful contaminants and pollutants are being handled. Similarly, if an underground pipe has a leak, excess water or debris can enter the hydrant loop piping system, and thus, may enter the aircraft fuel tank. Consequently, it is imperative that the integrity of the underground pipelines be monitored and maintained.

In light of all of these considerations, most entities utilizing underground pipelines for distributing fuel have implemented some sort of leak detection system. However, the leak detection systems that are utilized are typically operated in a manual manner (either partly or entirely). Thus, the manpower and operation costs associated with these types of leak detection systems may be considerable.

Accordingly, there exists a need for methods, systems, and computer program products for automatically detecting leaks in a type III hydrant fuel piping system.

SUMMARY

The subject matter described herein includes methods, systems, and computer program products for automatically detecting leaks in a type III hydrant fuel piping system. In one embodiment, the method includes automatically actuating one or more valves to isolate a hydrant loop of a type III hydrant fuel piping system from the remainder of the system. The pressure in the hydrant loop is varied. The pressure in the hydrant loop is measured over time in response to the varying of the pressure.

The subject matter described herein for automatically detecting a leak in a type III hydrant fuel piping system may be implemented using a computer program product comprising computer executable instructions embodied in a computer readable medium. Exemplary computer readable media suitable for implementing the subject matter described herein includes disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

The present subject matter relates to systems, methods, and computer program products for automatically detecting leaks in a type III hydrant fuel piping system. Notably, the present subject matter performs real time pressure measurements in pressurized underground pipelines to accurately determine the "tightness" of a pipeline system. In one embodiment, a leak detection system (LDS) can be incorporated in an existing airport fuel hydrant and transfer piping system, such as a type III hydrant fuel system. Alternatively, the LDS may be incorporated into a type III hydrant fuel system at the onset of the fuel system's construction.

Figure 1:
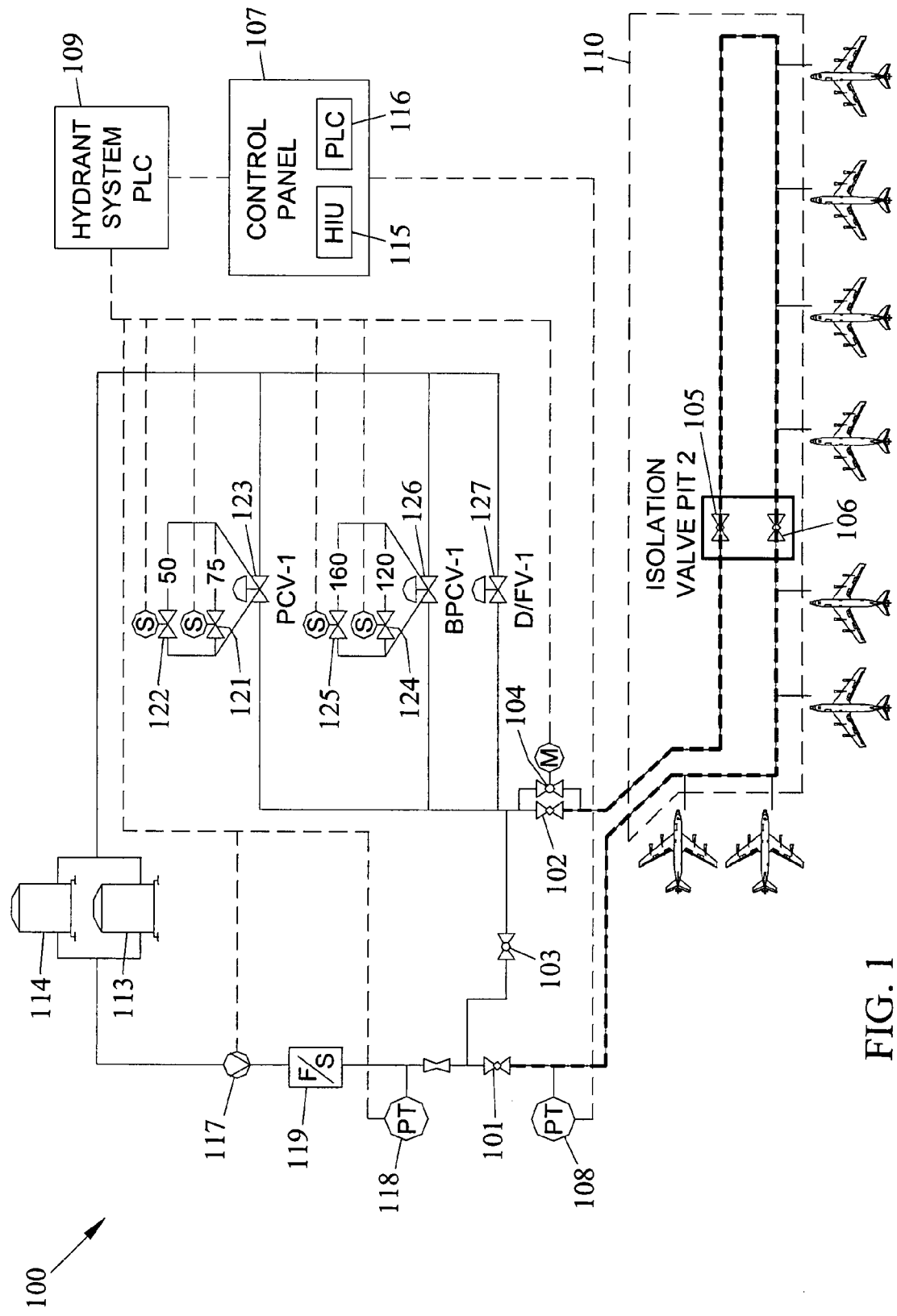
FIG. 1 is an exemplary aviation fuel distribution system including a type III hydrant fuel piping system that includes a leak detection system according to an embodiment of the subject matter described herein.

FIG. 1 illustrates an exemplary fuel system 100 in which the present subject matter may be incorporated. In one embodiment, fuel system 100 may include a type III hydrant fuel system. Fuel system 100 includes a plurality of isolation valves 101-102, 105-106, a crossover valve 103, a motor actuated pressurization/depressurization valve 104 (also known as bypass valve 104), a first pressure control valve 123 (with solenoid pilot control valves 121-122), a second pressure control valve 126 (with solenoid pilot control valves 124-125), a defuel/flush valve 127, a pressure transmitter 118, a hydrant system programmable logic controller (PLC) 109, fuel storage tanks 113 and 114, a fuel pump 117, a filter/separator unit 119, and piping section 110. The LDS portion of fuel system 100 includes control panel 107 and pressure transmitter 108. In one embodiment, the fuel system 100 may be equipped with a Hydrant Tight® Automated LDS manufactured by Hansa Consult of North America, LLC.

Isolation valves 101-102, 105-106 include various types of valves that are used to isolate and manipulate at least a portion of piping section 110. Namely, valves 101-102, 105-106 may be opened or closed to isolate or enclose piping section 110 of fuel system 100 for leak detection testing. Likewise, valves 101-102, 105-106 may be opened or closed in a particular manner for the normal distribution of fuel to the aircraft fleet depicted in FIG. 1. In one embodiment, valves 101-102 are each equipped with motor actuators so that control panel 107 (via PLC 109) is able to control valves 101-102 in an automated fashion. In one embodiment, valves 101, 102, 105, and 106 are double block and bleed valves (DBBVs) and function as isolation valves. Valve 103 is a crossover recirculation valve and valve 104 is a motor actuated pressurization/depressurization bypass valve used to increase or decrease the pressure level in piping section 110 during leak detection testing.

Control valve 123 and control valve 126 may include various types of pressure control valves. For example, control valve 123 may include a normal pressure control valve (PCV) (with solenoid control pilot valves (SOVs) 121-122) and control valve 126 may include a back pressure control valve (BPCV) (with solenoid control pilot valves (SOVs) 124-125). In one embodiment, PCV 123 and BPCV 126 are capable of increasing or decreasing the pressure in the piping section 110 (via valve 104) depending on which pressure control pilot valve is opened or closed. For example, solenoid controlled pilot valves SOVs 121, 122, 124, and 125 may be used to regulate the pressure level in piping section 110 to 75 psi, 50 psi, 120 psi, and 160 psi, respectively. In one embodiment, control valves 123 and 126 are equipped with solenoids, thereby enabling the pressure control/back pressure control valves to be opened and closed by energizing and de-energizing the solenoids via commands from control panel 107 (via PLC 109). Valve 127 may include a defuel/flush valve (D/FV) that remains closed during testing. Even though only thirteen valves are shown in FIG. 1, fuel system 100 may utilize any number of valves without departing from the scope of the present subject matter.

Control panel 107 sends instructions to hydrant system PLC 109 which is responsible for actuating and confirming that the required fuel system isolation valves are open and/or closed and the designated section(s) of pipeline is isolated and ready to test. PLC 109 is also responsible for manipulating the pressure control pilot valves 121-126 and bypass valve 104 during a leak detection test based upon instruction from control panel 107. Upon completion of a leak detection test, hydrant system PLC 109 checks to ensure that the fuel system valves are returned to their normal operating position for distributing fuel.

Control panel 107 (i.e., an LDS controller) may include a host interface unit (HIU) 115 and a programmable logic controller (PLC) 116. HIU 115 may include an operator interface that can be used by a system operator to initiate or monitor the pressurized leak detection testing. PLC 116 is responsible for interfacing with the existing hydrant system PLC 109 in order to establish the system dual pressure conditions that are used during the leak detection testing to determine the tightness of the system (i.e., obtain a tightness factor). In one embodiment, PLC 116 may include a computer processor that runs software or firmware programs designed to execute the leak detection tests. Notably, PLC 116 transmits signals to PLC 109 directing PLC 109 to manipulate (i.e., open and close) valves 101-106, 121-126. In one embodiment, both PLC 109 and PLC 116 are combined in control panel 107. Although PLC 116 controls PLC 109 during the leak detection operation, PLC 109 is the primary controlling unit for all other aspects of operating fuel system 100. For example, in an emergency fuel shutoff (EFSO) event, the hydrant system PLC 109 sends a signal to PLC 116 and PLC 116 will abort the leak detection test operation, if applicable.

Pressure transmitter 108 is responsible for acquiring pressure measurements from piping section 110 (e.g., when isolated) and forwarding the measured data to control panel 107. In one embodiment, pressure transmitter 108 is attached to piping section 110 and is coupled to control panel 107 for communication purposes. Pressure transmitter 118 is responsible for measuring and relaying pressure readings in the fuel system 100 to the hydrant system PLC 109.

Piping section 110 includes a pipeline portion of the system 100 that is used to carry fuel to the fleet of airplanes (see FIG. 1). Piping section 110 is often referred to as the hydrant loop of system 100. In one embodiment, piping section 110 may include stainless or carbon steel, single wall piping that begins at valve 101, continues to isolation valve 106 and isolation valve 105, and terminates at valve 102. In another embodiment, piping section 110 may include stainless or carbon steel, double wall piping that begins at valve 101, continues to isolation valve 106 and isolation valve 105, and terminates at valve 102. In one embodiment, piping section 110 is the pipeline portion of fuel system 100 that is subjected to daily leak detection tests, wherein a single test period lasts for approximately 45 minutes.

To establish the dual pressures required during testing, the designated pumphouse hydrant valves along with the installed leak detection hydrant loop bypass pressurization/depressurization valve 104 are controlled by PLC 109, which receives its commands from control panel 107.

In one embodiment, a system operator initiates the leak detection test at control panel 107. In one embodiment, the leak detection test may be configured to automatically commence at a specific time each day.

Figure 2:
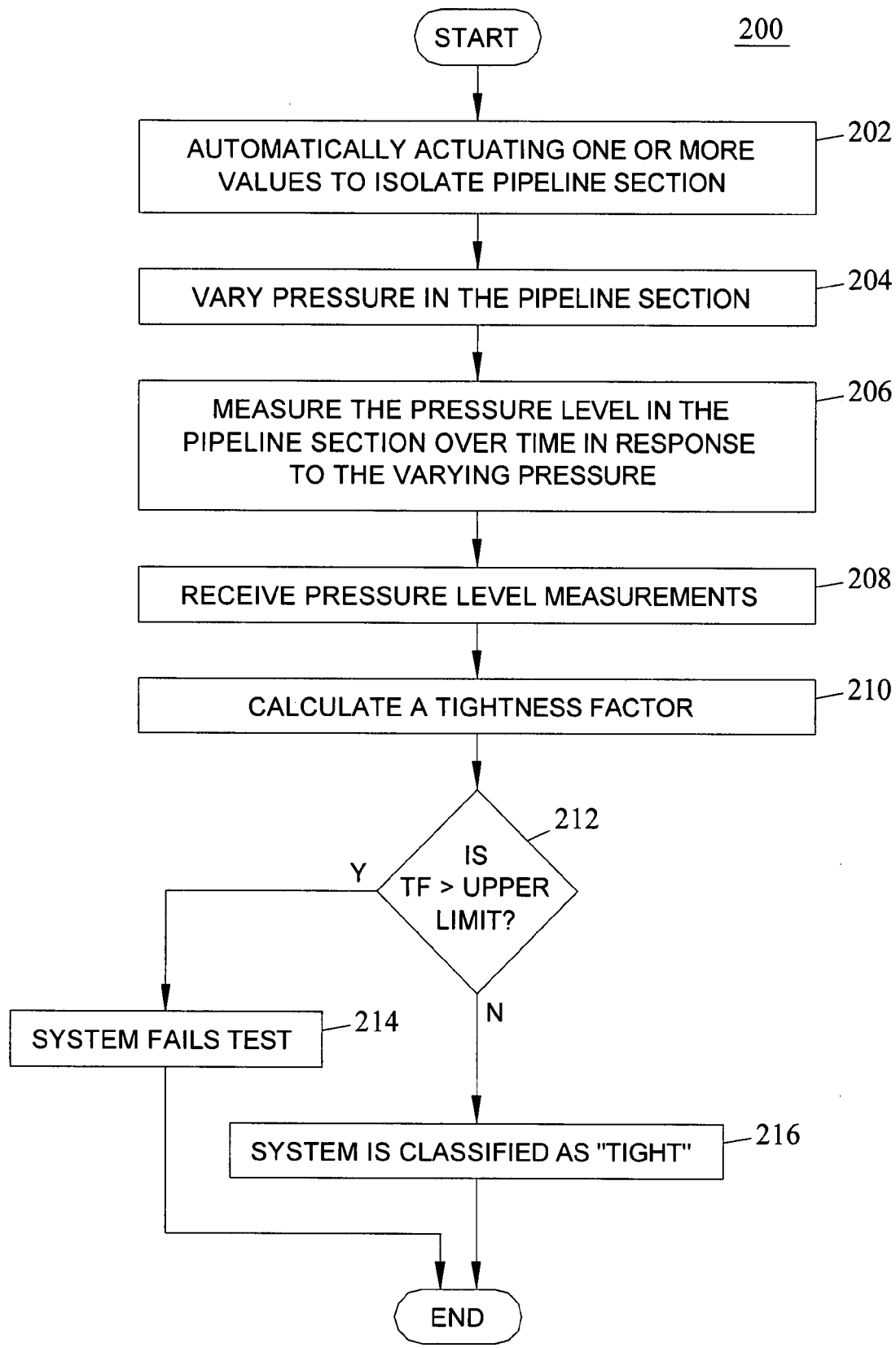
FIG. 2 is a flow chart illustrating exemplary steps for detecting leaks in a type III hydrant fuel piping system according to an embodiment of the subject matter described herein.

As previously mentioned, the present subject matter employs the measurement of pressure to determine if a pipeline section of fuel system 100 is leaking. One such method for detecting leaks in a type III hydrant fuel system is depicted as method 200 in FIG. 2. In block 202, one or more valves are automatically actuated to isolate a hydrant loop. In one embodiment, the control panel 107 (via PLC 109) transmits instructions to motor actuators on valves 101-106 to isolate piping section 110 (i.e., the "hydrant loop") from the rest of the system 100. Referring to FIG. 1, isolation valve 101 and isolation valve 102 are closed to isolate piping section 110.

In block 204, the pressure in the hydrant loop is varied. In one embodiment, the pressure of piping section 110 is initially lowered to a predefined pressure level (e.g., 50 psi) by control panel 107. Namely, control panel 107 sends instructions via PLC 109 to open the pressurization/depressurization bypass valve 104 and pilot valve SOV 122, the latter of which enables piping section 110 to reach 50 psi. After a predefined settling period, the pressure in piping section 110 is raised to a pre-defined high pressure test level by control panel 107 through PLC 109, which utilizes existing pumps and pressure control valves. For example, the necessary high pressure level may be adjusted to a pressure level between 120-160 psi by using BPCV 126 in addition to SOV 124 or SOV 125. In one embodiment, SOV 125 receives an instruction from control panel 107 to open, which will allow the system to raise the recirculation piping pressure to 160 psi. After capturing the predefined test pressure of 150 psi, piping section 110 is then completely isolated and closed tight (via valve 104). Notably, piping section 110 is full of fuel and the pressure increase is attributed to the addition of fuel.

After a predefined settling period (e.g., 10 minutes) the pressure level in piping section 110 is lowered for a second time. For example, the pressure level in piping section 110 is reduced to a low pressure level by first opening pressurization/depressurization valve 104 which caused the pressure to be relieved. Afterwards, the low-pressure level may be adjusted (i.e., "fine tuned") to a pressure level between 40 and 60 psi by using at least one of the PVC pilot valves SOV 121 or SOV 122. In one embodiment, SOV 122 is used again to depressurize piping section 110 to 50 psi. The pressure in pipe section 110 is subsequently left to settle for a predefined period. After the settling time expires, the pipe section is pressurized to a second high pressure level (e.g., 120 to 160 psi) in an identical manner described to attain the first high pressure level.

In block 206, the pressure in the hydrant loop is measured over time in response to the variation of the pressure levels. In one embodiment, pressure transmitter 108 obtains "existing" pressure measurements to determine the current pressure level in piping section 110 at several instances over a period of time (i.e., the duration of the leak detection test). Specifically, pressure transmitter 108 takes measurement readings after the predefined settling periods described in block 204, but before the pressure in piping section 110 is increased or decreased by the control panel 107 (via PLC 109). In one embodiment, this alternating sequence of pressurizing pipe section 110 and taking corresponding measurements is known as the pressure-step method.

In block 208, the pressure level measurements are received. In one embodiment, pressure transmitter 108 sends the pressure level measurements in real time to control panel 107 for recording, processing, and evaluation.

In block 210, a tightness factor (TF) for the condition of the tested pipe section is calculated. In one embodiment, a processor at control panel 107 evaluates the collected pressure readings and calculates a TF from the data. For example, the pressure data may be applied as input to an algorithm executed by the processor.

In block 212, a determination is made as to whether the calculated tightness factor (TF) is greater than a predefined upper limit threshold. If TF is greater than the upper tolerable limit, then method 200 continues to block 214 where the tested piping section receives a failing result. If TF is less than the upper threshold, then method 200 proceeds to step 216, where the condition of the tested piping section is indicated as "tight" and receives a passing result. Regardless of the test outcome, the TF is recorded and permanently stored by control panel 107 for future reference. Method 200 then ends.

Figure 3:
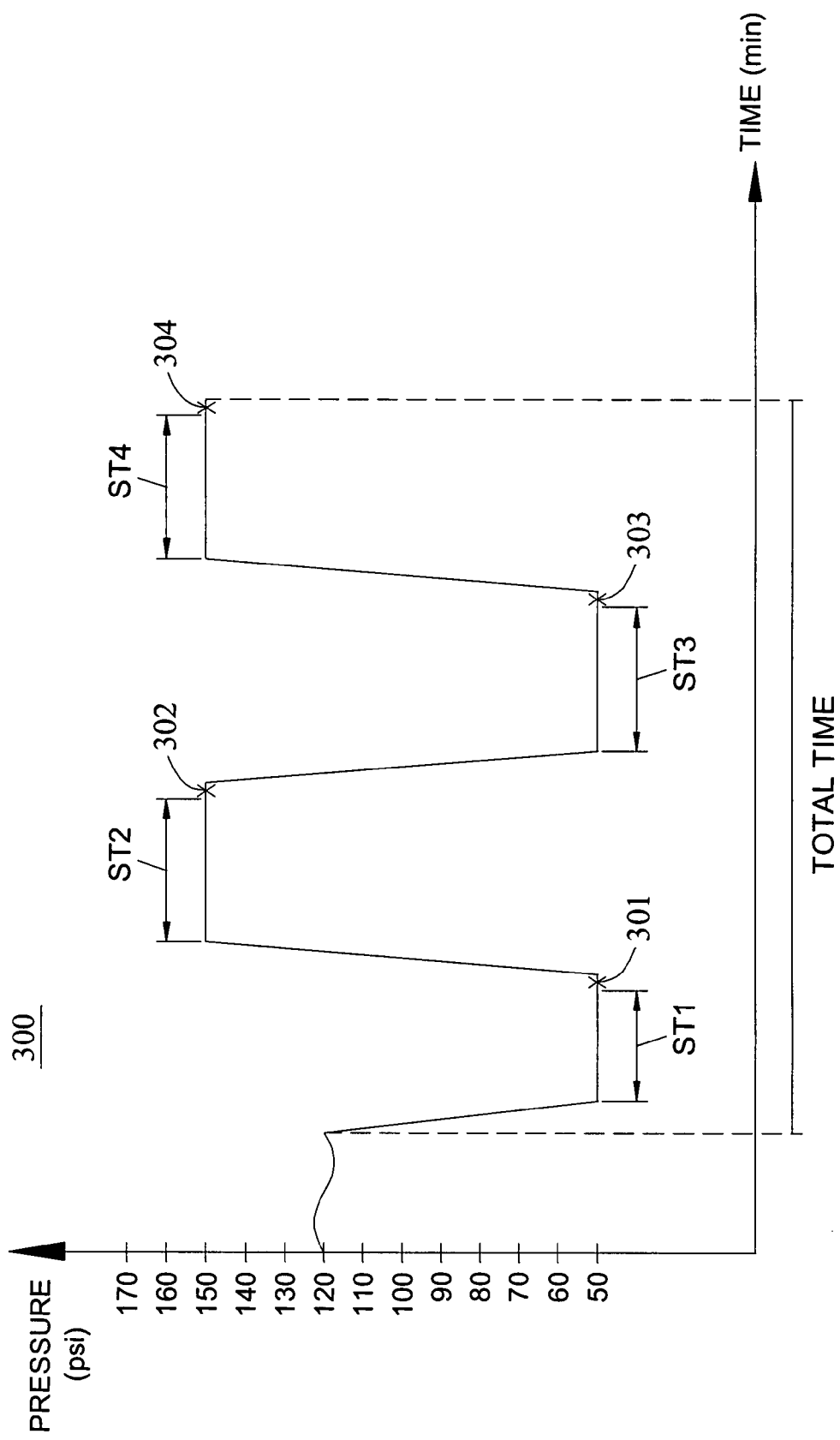
FIG. 3 depicts an exemplary line graph illustrating the timing of leak detection measurements according to an embodiment of the subject matter described herein.

Method 200 can be further clarified using a graphical illustration afforded by FIG. 3. Specifically, FIG. 3 depicts graph 300 which is defined by a vertical "pressure" axis and a horizontal "time" axis. In one embodiment, the normal operating pressure of fueling system 100 may be 120 psi. At the start of the leak detection process (e.g., block 202 of FIG. 2), the pressure is relieved to a first low pressure level, as indicated by the 50 psi level in FIG. 3. After a settling time of "ST1" (e.g., 3-10 minutes), a first set of pressure measurements 301 is recorded. Afterwards, the pressure level is increased to a first high pressure (e.g., block 204 of FIG. 2), as indicated by the 150 psi level in FIG. 3. Similarly, after a settling time of "ST2", a second set of pressure measurements 302 is recorded. This process is repeated for the second low pressure measurement 303 and second high pressure measurement 304 as shown in FIG. 3.

As mentioned above, the present subject matter employs the pressure-step method to detect leaks in a tested pipe section. In one embodiment, the present subject matter may be applied to a type III hydrant fuel system. Notably, the present subject matter may take advantage of the standardized configuration of a type III hydrant fuel system to automate the leak detection process. Referring to FIG. 1, in one embodiment, the leak detection testing is initiated by an operator from a pumphouse control room (not shown in FIG. 1) via HIU 115. Alternatively, control panel 107 (i.e., PLC 116) may be programmed to execute the leak detection test automatically at a predefined time selected (e.g., during a non-fueling period). Control panel 107 is used to send instructions to hydrant system PLC 109 to actuate and confirm that the appropriate fuel system isolation valves are configured (i.e., closed or opened) to isolate piping section 110 for the leak detection test. Control panel 107 continues to communicate with PLC 109 as necessary to increase or decrease the pressure during the leak detection test. For example, control panel 107 instructs PLC 109 to open the BPCVs. In one embodiment, control panel 107 and PLC 109 may be incorporated into one structure.

In one embodiment, fuel system 100 must be initialized in preparation for the execution of the leak detection test. For example, hydrant system PLC 109 is switched to the "OFF" position and a mode selector switch at control panel 107 is set to a "tightness test" mode. Control panel 107 may then be used to "energize" pilot control valve 121 to a closed position. Since pilot control valve 121 (among others) is equipped with a solenoid actuator, the valve may be electrically operated by control panel 107. Similarly, pilot control valve 122 is de-energized to a closed position. Isolation valves 101-102 equipped with motorized actuators are subsequently closed, after which crossover valve 103 is instructed to open by control panel 107. By opening crossover valve 103, the remainder of the pipeline system (i.e., all pipelines except for piping section 110) may be connected as a complete circuit loop. Defuel/flush valve (D/FV) 127 is energized to a closed position by control panel 107.

Once the initialization process is completed, the actual leak detection process may begin. In one embodiment, control panel 107 is manually prompted by a system operator to commence the test. In an alternate embodiment, the leak detection process is programmed to automatically begin at a predefined time. Control panel 107 (via control panel PLC 116) transmits an electronic instruction to automatically open pressurization/depressurization valve 104 (i.e., a motor actuator on valve 104 receives the signal and, in response, mechanically opens the valve). Likewise, control panel 107 sends a signal to de-energize back pressure control pilot valve (BPCV) 124 to the closed position.

Next, BPCV pilot valve 125 is energized by control panel 107 to an open position. A relay for the lead pump is also enabled by control panel 107, while D/FV 127 remains closed. This configuration enables pressure from BPCV 126 (e.g., 160 psi) to flow into piping section 110 via open valve 104. Once the pressure level in piping section 110 reaches approximately 150 psi, bypass valve 104 is instructed by control panel 107 to close and the pump relay is subsequently disabled. The piping section 110 is then left to settle for a predefined amount of time, after which pressure measurements are sent by pressure transmitter 108 to control panel 107 for recording and processing. The pressure is then reduced to a lower pressure level (e.g., 50 psi) by opening bypass valve 104 and opening PCV pilot valve 122, which establishes the pressure level in piping section 110 to lower to 50 psi. Bypass valve 104 is closed once more to isolate piping section 110. Piping section 110 is then left to settle at the lower pressure level for a predefined amount of time, after which another set of pressure measurements is sent by pressure transmitter 108 to control panel 107.

Fueling system 100 takes a second set of high pressure readings in the manner described above. Once the pressure readings are sent to control panel 107, control panel 107 stores and processes the pressure readings using an algorithm to derive a tightness factor (TF). The algorithm used to derive the TF is substantially the "pressure-step method" algorithm known to those of skill in the art and includes a number of variables (e.g., pressure reading data, test section volume, pipe wall thickness, product density, etc). This TF is used to indicate the overall integrity of the tested piping section 110. Thus, the tightness factor (TF) may be determined by processing pressure measurement results obtained by pressure transmitter 108. In one embodiment, the tightness factor may be the leaking liquid volume (e.g., gallons per hour) of the checked pipeline section volume that is typically associated with a standard operating pressure (e.g., 120 psi).

After the leak detection test is completed, PLC 116 may generate and store the test results with no further action required on the part of the operator. Similarly, hydrant system PLC 109 is prompted by PLC 116 to return the fuel system valves to their normal operating positions. Also, PLC 116 yields all valve sequencing control back to hydrant system PLC 109.

In one embodiment, the test results are evaluated and processed by control panel 107. In any pressure based test, the determination of a leak is largely influenced by temperature and pressure changes during testing. The pressure-step method is based on the physical fact that given a defined leak size, the rate of leakage is proportionally larger at a higher pressure than at a lower pressure. Because the leak rate is directly related to a change in pressure, the determination of whether the tested pipe section is satisfactorily "tight" may be ascertained from pressure gradients derived from the leak detection test. The test results enable the present subject matter to compare the pressure curves of different pressure levels and determine the tightness factor (TF) irrespective of any temperature change during testing.

Figure 4:
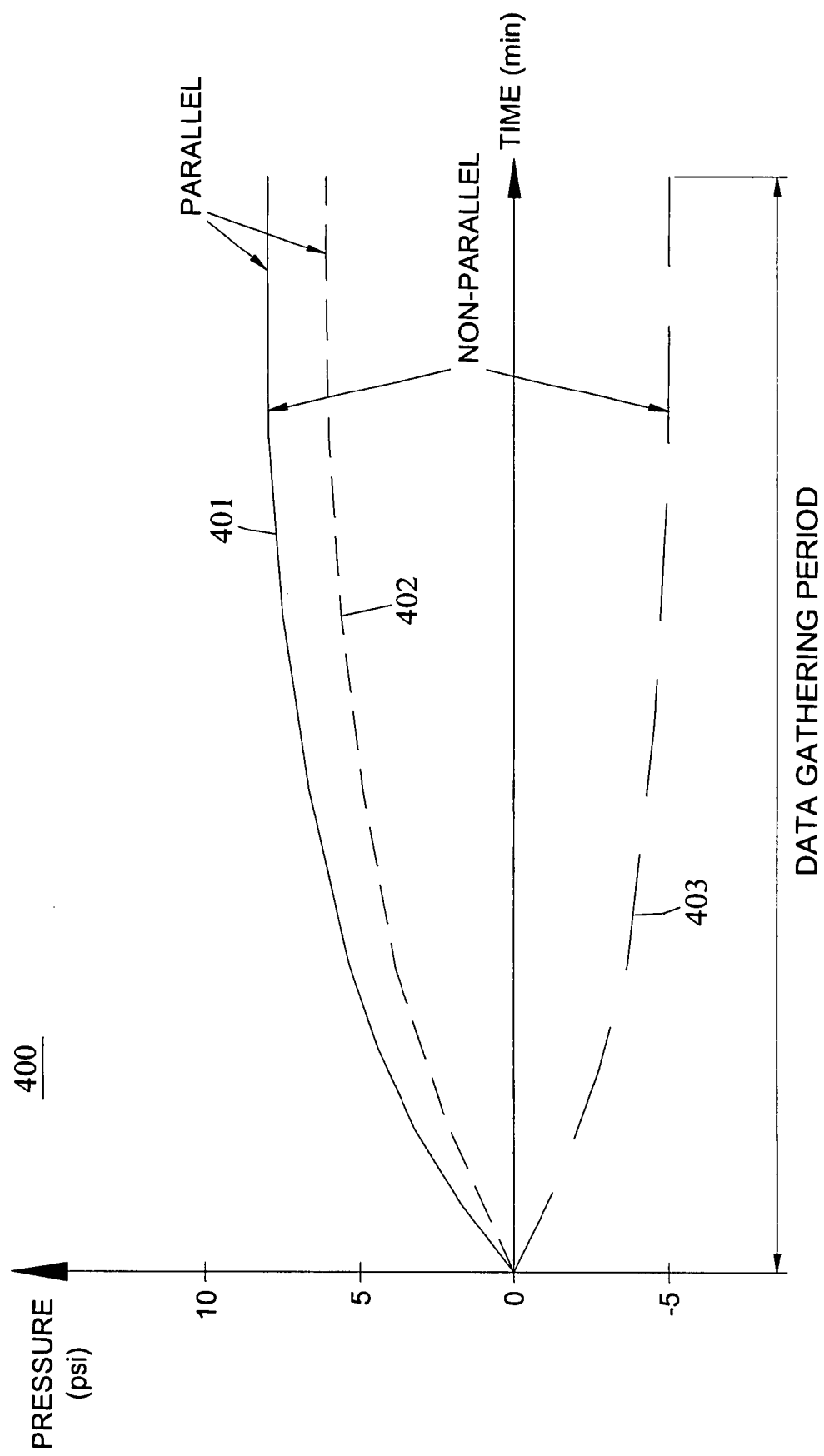
FIG. 4 depicts an exemplary pressure curve graph for detecting leaks according to an embodiment of the subject matter described herein.

FIG. 4 depicts an exemplary pressure curve graph 400 generated from the obtained pressure level measurements and may be used to indicate a leak in a test piping section. Assuming ideal conditions, the curves in FIG. 4 should be depicted as being horizontal and parallel (e.g., curve 401 and curve 402). However, temperature, leaks, and other external effects may result in ascending or descending characteristics. If the system is found to be "not tight," the leakage rate will be greater at a high test pressure than at a lower test pressure. Consequently, the pressure curves no longer run parallel with respect to each other (e.g., curve 401 and curve 403).

As mentioned above, despite the significant influence temperature changes may have on pressure levels (and thus, leak determination), the present subject matter does not require temperature measurement or compensation. Any temperature influences are addressed by application of the pressure-step methodology itself.

Furthermore, the present subject matter is able to determine the leak rate on the basis of specific properties of the material and geometrical shape of the piping system being tested. In one embodiment, the evaluated tightness factors are recorded in a statistical database.

Figure 5A:
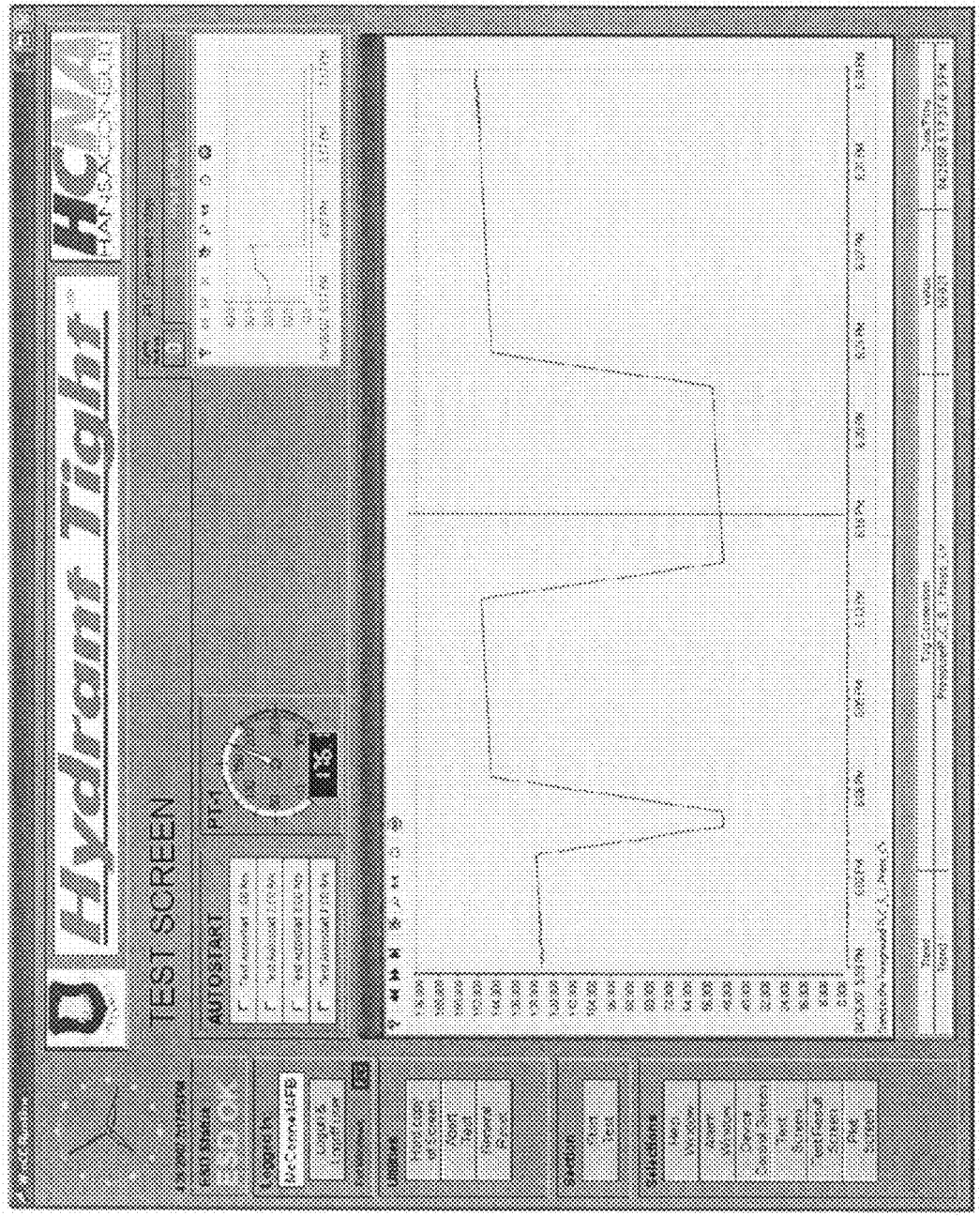
FIG. 5A depicts an exemplary computer screen capture of varying pressure measurements according to an embodiment of the subject matter described herein.
Figure 5B:
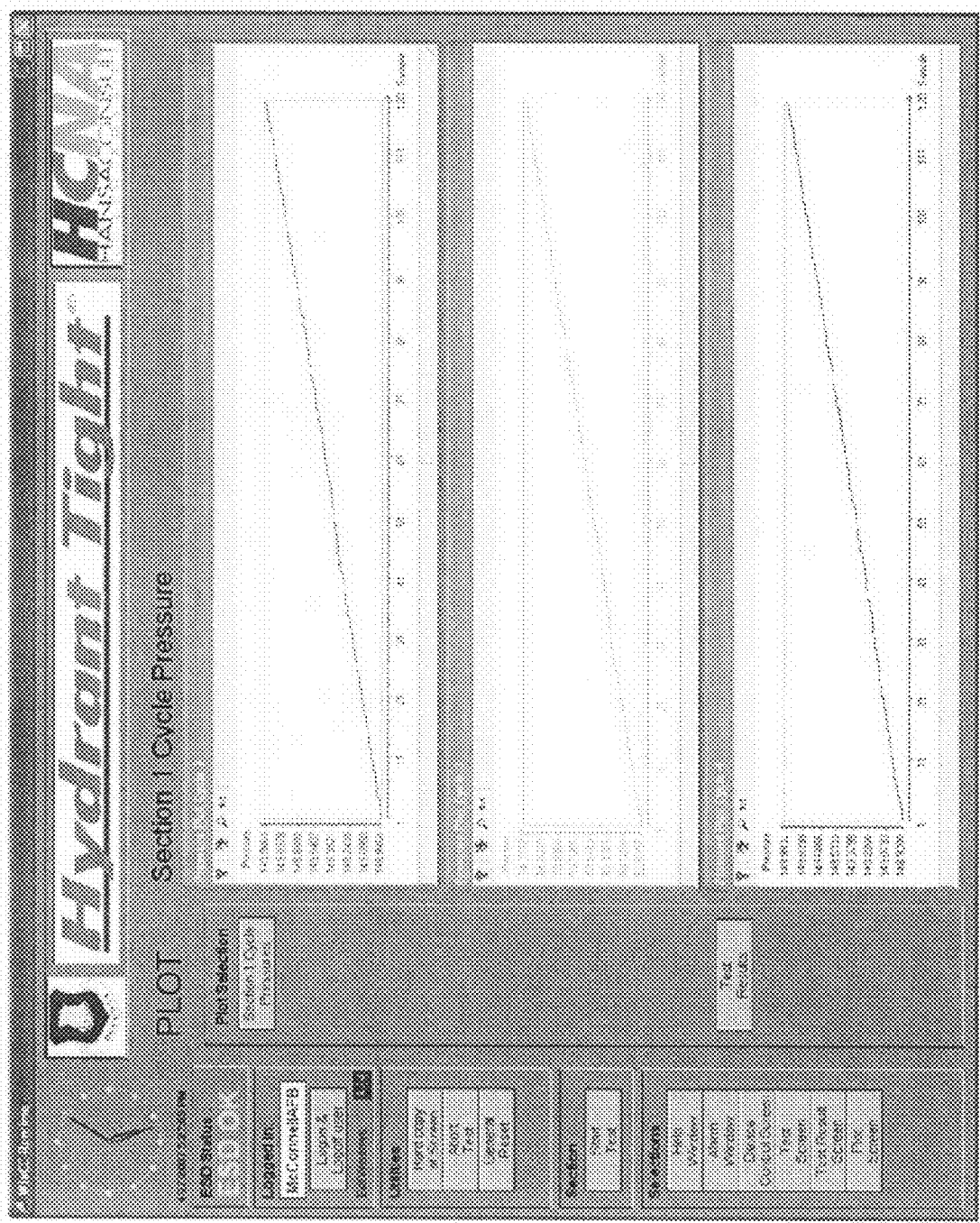
FIG. 5B depicts an exemplary computer screen capture of pressure curves according to an embodiment of the subject matter described herein.
Figure 5C:
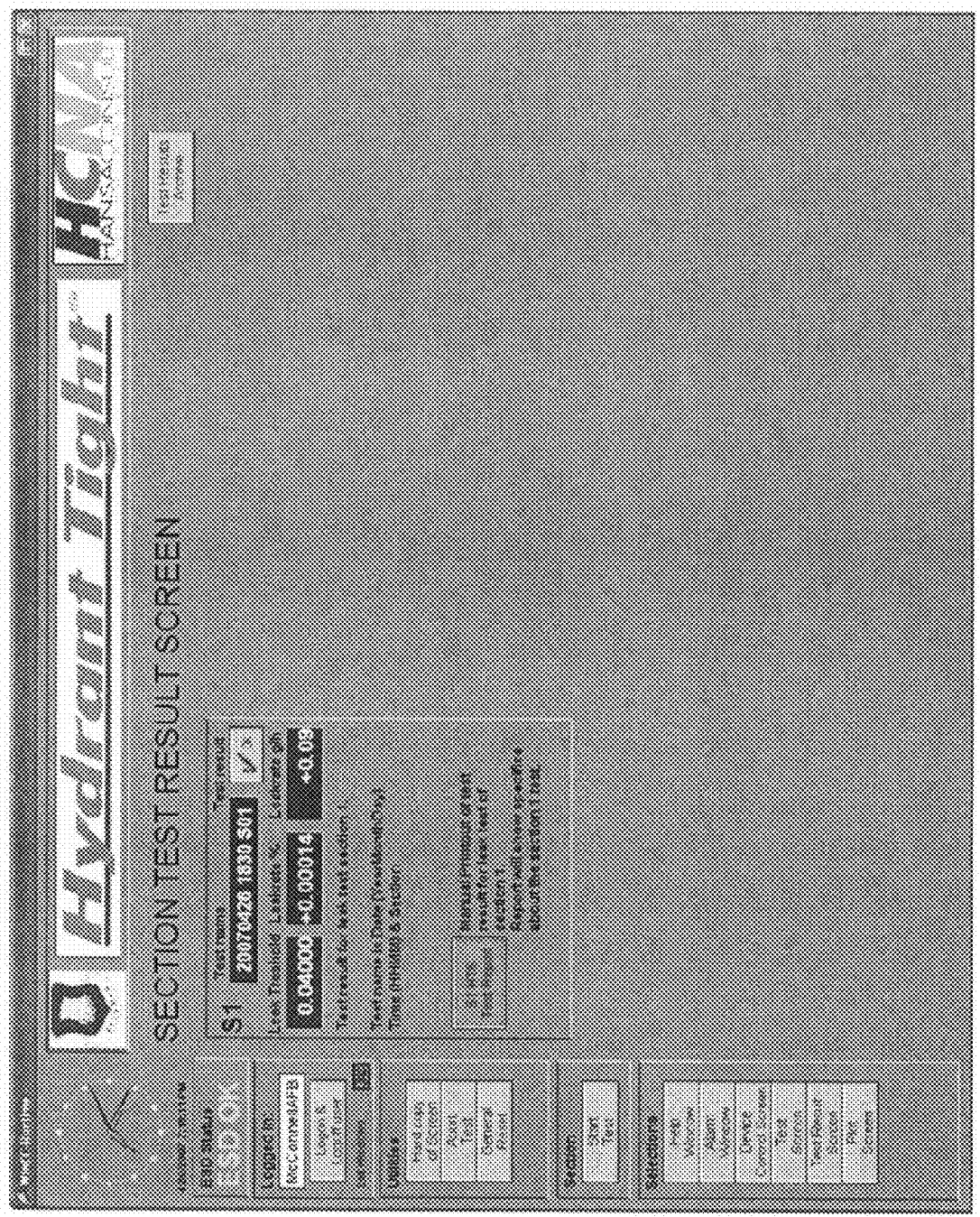
FIG. 5C depicts an exemplary computer screen capture of a leak detection test result according to an embodiment of the subject matter described herein.
Figure 5D:
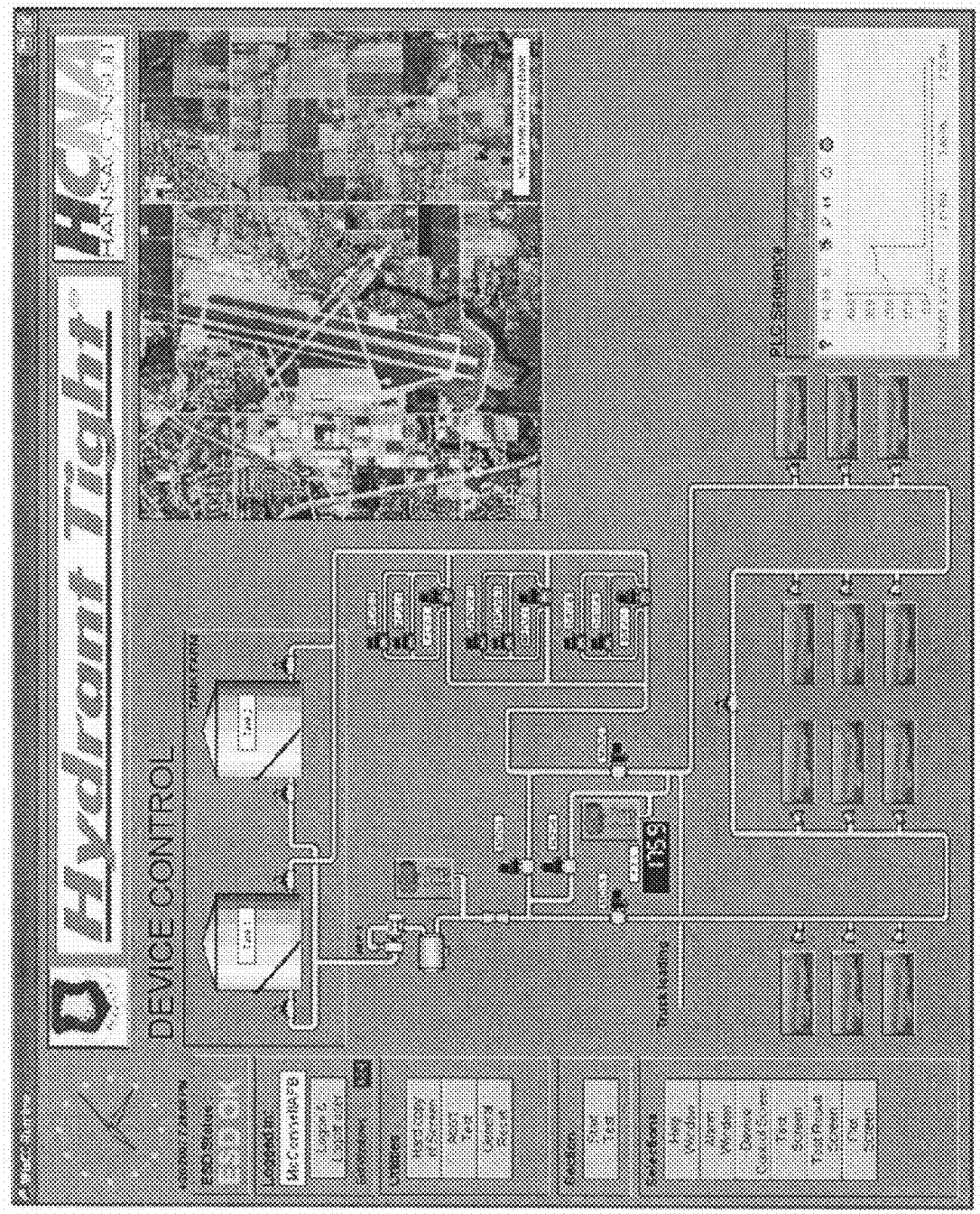
FIG. 5D depicts an exemplary computer screen capture of the configuration and control of the components identified in FIG. 1.

In one embodiment, the present subject matter is supported by a computer software or firmware program that is executed by a processor in control panel 107. Namely, control panel 107 not only utilizes software programs for conducting the leak detection test, but for graphically displaying the pressure measurements for evaluation and the leak detection results. Software programs are also utilized for the storage and retrieval of the test data and results. For example, FIG. 5A depicts a computer screen capture of the pressure measurements recorded by pressure transmitter 108. This screen capture is an exemplary embodiment of the pressure variations induced in a piping section during the execution of the leak detection test. Notably, this screen capture is an example similar to the graphical pressure measurement representation depicted in FIG. 3. FIG. 5B is an exemplary computer screen capture of the pressure curves generated from the pressure level measurements depicted-in FIG. 5A. Similarly, FIG. 5C is an exemplary computer screen capture of the test results for a tested pipe section(s). In this example, the test report indicates that a pipe section was tested and exhibited a leak rate percentage that was lower than the leak threshold limit. The test result is indicated as "OK" and quantified in a gallons per hour format. The test result is given a definitive label as to date/time/test section for data archival and retrieval. FIG. 5D is an exemplary computer screen capture of one embodiment of system 100 in FIG. 1. In this example, the representative components are depicted. In one embodiment, control panel 107 may display the screen depicted in FIG. 5D. The screen may also be interactive in a manner that enables a system operator to directly manipulate the system components (e.g., using a mouse or touch screen to interact with a given valve). Notably, this screen (and corresponding software) and PLC control allow for the control of the identified components.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a hydrant fuel piping system for leaks, the method comprising:

automatically actuating one or more valves to isolate a hydrant loop of a hydrant fuel piping system from the remainder of the system;

varying pressure in the hydrant loop; and measuring the pressure in the hydrant loop over time in response to the varying of the pressure, wherein the measured pressure is used to determine the integrity of the hydrant loop without temperature compensation and by addressing influence of temperature by application of a pressure-step methodology.

2. A method for testing a hydrant fuel piping system for leaks, the method comprising:
automatically actuating one or more valves to isolate a hydrant loop of a hydrant fuel piping system from the remainder of the system;
varying pressure in the hydrant loop; and
measuring the pressure in the hydrant loop over time in response to the varying of the pressure;
wherein varying the pressure comprises:
applying a first low pressure level to the hydrant loop;
applying a first high pressure level to the hydrant loop after a first predefined settling period;
applying a second low pressure level to the hydrant loop after a second predefined settling period; and
applying a second high pressure level to the hydrant loop after a third predefined settling period.

3. The method of claim 2 wherein measuring the pressure in the hydrant loop over time comprises:
measuring a first existing pressure level in the hydrant loop at the end of the first predefined settling period;
measuring a second existing pressure level in the hydrant loop at the end of the second predefined settling period;
measuring a third existing pressure level in the hydrant loop at the end of the third predefined settling period; and
measuring a fourth existing pressure level in the hydrant loop at the end of a fourth predefined settling period.

4. The method of claim 1, wherein varying the pressure and measuring the pressure in the hydrant loop collectively comprise a pressure-step test.

5. The method of claim 1, wherein measuring the pressure in the hydrant loop is performed by a pressure transmitter that is integrated with the system.

6. The method of claim 3 further comprising:
transmitting, in real time, the measured existing pressure levels from a pressure transmitter coupled to the hydrant loop to a control panel located in the system for processing.

7. The method of claim 6 further comprising:
evaluating pressure data derived from the measured existing pressure levels and determining a tightness factor from the evaluated pressure data.

8. The method of claim 1 wherein automatically actuating one or more valves comprises:
providing instructions from a control panel located in the system to the one or more valves to vary the pressure in the hydrant loop.

9. The method of claim 8 wherein the one or more valves is equipped with a solenoid pilot control or a motor actuator controlled by the control panel.

10. The method of claim 1 wherein the method is initiated by an operator or programmed to commence at a predefined time.

11. A leak detection system (LDS) for a hydrant fuel piping system comprising:
an LDS controller for automatically actuating one or more valves to isolate a hydrant loop of a hydrant fuel piping system from the remainder of the system and for varying pressure in the hydrant loop; and
a pressure transmitter coupled to the LDS controller and the hydrant loop for measuring the pressure in the hydrant loop over time in response to the varying of the pressure, wherein the measured pressure is used to determine the integrity of the hydrant loop without temperature compensation and by addressing influence of temperature by application of a pressure-step methodology.

12. A leak detection system (LDS) for a hydrant fuel piping system comprising:
an LDS controller for automatically actuating one or more valves to isolate a hydrant loop of a hydrant fuel piping system from the remainder of the system and for varying pressure in the hydrant loop; and
a pressure transmitter coupled to the LDS controller and the hydrant loop for measuring the pressure in the hydrant loop over time in response to the varying of the pressure;
wherein the LDS controller is further adapted to apply a first low pressure level to the hydrant loop, apply a first high pressure level to the hydrant loop after a first predefined settling period, apply a second low pressure level to the hydrant loop after a second predefined settling period, and apply a second high pressure level to the hydrant loop after a third predefined settling period.

13. The leak detection system of claim 12 wherein the pressure transmitter is further adapted to measure a first existing pressure level in the hydrant loop at the end of the first predefined settling period, measure a second existing pressure level in the hydrant loop at the end of the second predefined settling period, measure a third existing pressure level in the hydrant loop at the end of the third predefined settling period, and measure a fourth existing pressure level in the hydrant loop at the end of the fourth predefined settling period.

14. The leak detection system of claim 13 wherein the one or more valves is equipped with a solenoid pilot control or a motor actuator controlled by the LDS controller.

15. The leak detection system of claim 14 wherein the LDS controller provides instructions to the motor actuator or the solenoid to vary the pressure in the hydrant loop.

16. The leak detection system of claim 11 wherein the LDS controller is initiated by an operator or programmed to commence at a predefined time.

17. The leak detection system of claim 13 wherein the LDS controller is further adapted to derive a tightness factor from the measured existing pressure levels.

18. The leak detection system of claim 17 wherein the LDS controller derives a tightness factor by applying each of a number of pressure levels as input to a pressure-step test method algorithm.

19. A computer program product comprising computer executable instructions embodied in a computer readable medium for performing steps comprising:
automatically actuating one or more valves to isolate a hydrant loop of a hydrant fuel piping system from the remainder of the system;
varying pressure in the hydrant loop; and
measuring the pressure in the hydrant loop over time in response to the varying of the pressure, wherein the measured pressure is used to determine the integrity of the hydrant loop without temperature compensation and by addressing influence of temperature by application of a pressure-step methodology.

20. A computer program product comprising computer executable instructions embodied in a computer readable medium for performing steps comprising:
automatically actuating one or more valves to isolate a hydrant loop of a hydrant fuel piping system from the remainder of the system;
varying pressure in the hydrant loop;
measuring the pressure in the hydrant loop over time in response to the varying of the pressure;

evaluating pressure data derived from the measured pressure without temperature compensation and by addressing influence of temperature by application of a pressure-step methodology; and determining a tightness factor from the evaluated pressure data.

21. The computer program product of claim 20 further comprising:

graphically presenting the pressure data; and graphically presenting a leak test result derived from the evaluated pressure data.

22. The computer program product of claim 21 further comprising:

archiving the pressure data and the leak detection result for future retrieval and review.

* * * * *